United States Patent
Yeh

(10) Patent No.: US 10,359,872 B2
(45) Date of Patent: *Jul. 23, 2019

(54) PREDICTION-BASED TOUCH CONTACT TRACKING

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 198 days.

This patent is subject to a terminal disclaimer.

(21) Appl. No.: 15/432,215

(22) Filed: Feb. 14, 2017

(65) Prior Publication Data

US 2017/0153768 A1 Jun. 1, 2017

Related U.S. Application Data

(63) Continuation of application No. 14/028,713, filed on Sep. 17, 2013, now Pat. No. 9,606,656.

(60) Provisional application No. 61/702,301, filed on Sep. 18, 2012.

(51) Int. Cl.
G06F 3/041 (2006.01)
G06F 3/0488 (2013.01)
G06F 3/044 (2006.01)

(52) U.S. Cl.
CPC ............ *G06F 3/0412* (2013.01); *G06F 3/044* (2013.01); *G06F 3/0418* (2013.01); *G06F 3/0488* (2013.01)

(58) Field of Classification Search
None
See application file for complete search history.

(56) References Cited

U.S. PATENT DOCUMENTS

| 5,995,081 | A | 11/1999 | Kato | |
|---|---|---|---|---|
| 6,295,378 | B1* | 9/2001 | Kitakado | G06K 9/222 345/17 |
| 7,463,779 | B2* | 12/2008 | Napper | G06K 9/222 382/186 |
| 7,792,603 | B2* | 9/2010 | Hioki | G05B 19/4103 700/187 |
| 7,969,440 | B1 | 6/2011 | Polyakov et al. | |
| 8,487,896 | B1 | 7/2013 | Brown et al. | |
| 8,760,423 | B2 | 6/2014 | Ohta | |
| 9,218,094 | B1* | 12/2015 | Slezinskyy | G06F 3/0488 |
| 9,606,656 | B2* | 3/2017 | Yeh | G06F 3/0412 |
| 2007/0018966 | A1* | 1/2007 | Blythe | G06F 3/0425 345/173 |
| 2010/0097352 | A1* | 4/2010 | Ahn | G06F 3/0412 345/175 |

(Continued)

FOREIGN PATENT DOCUMENTS

TW 201232357 1/2011

*Primary Examiner* — Dorothy Harris
(74) *Attorney, Agent, or Firm* — WPAT, PC

(57) ABSTRACT

When an external object approaches or touches a touch sensor, predicted locations of the external object can be generated by detected locations according to signals from the touch sensor. The latest predicted location is shifted backwards towards the latest reported location for a portion of the distance between the predicted location and the latest reported location to generate a new reported location, whereby jittering of the reported locations caused by noise in the signals of the touch sensor can be reduced or filtered.

18 Claims, 5 Drawing Sheets

(56) References Cited

U.S. PATENT DOCUMENTS

| | | | |
|---|---|---|---|
| 2011/0212781 A1* | 9/2011 | Koizumi | A63F 13/06 463/37 |
| 2011/0310118 A1* | 12/2011 | Asmi | G06F 3/04883 345/619 |
| 2012/0194444 A1 | 8/2012 | Chang et al. | |
| 2012/0206380 A1* | 8/2012 | Zhao | G06F 3/04883 345/173 |
| 2013/0021272 A1 | 1/2013 | Wang | |
| 2013/0181908 A1* | 7/2013 | Santiago | G06F 3/0488 345/173 |
| 2014/0078087 A1* | 3/2014 | Ho | G06F 3/0412 345/173 |

* cited by examiner

When an external object touches or approaches a touch screen, a detected location corresponding to the external object is continuously generated from signals received by the touch screen.
510

A predicted location is generated continuously based on a most recently generated detected location and at least one previously generated detected location.
530

A new reported location is generated continuously based on at least one predicted location including the most recently generated predicted location and at least one reported location including the most recently generated reported location.
550

FIG. 5

When an external object touches or approaches a touch screen, a plurality of continuous detected location corresponding to the external object are generated from signals received by the touch screen.
610

A plurality of predicted locations are generated based on the detected locations, wherein each predicted location is generated based on at least two detected locations.
630

A plurality of new reported location are generated based on the predicted locations, wherein each reported location is generated based on at least one predicted location and at least one reported location.
650

FIG. 6

When an external object touches or approaches a touch screen, a detected location corresponding to the external object is continuously generated from signals received by the touch screen.
510

A virtual detected location is continuously generated based on a most recently generated detected location and an adjacent detected location.
520

A predicted location is generated continuously based on a most recently generated detected location and at least one previously generated detected location.
530

A virtual predicted location is generated continuously based on a most recently generated virtual detected location and at least one previously generated virtual detected location.
540

A new reported location is generated continuously based on at least one predicted location including the most recently generated predicted location and at least one reported location including the most recently generated reported location.
550

A new virtual reported location is generated continuously based on at least one virtual predicted location including the most recently generated virtual predicted location and at least one virtual reported location including the most recently generated virtual reported location.
560

FIG. 7

When an external object touches or approaches a touch screen, a plurality of continuous detected location corresponding to the external object are generated from signals received by the touch screen.
610

A plurality of continuous virtual detected location are generated based on the detected locations, wherein each virtual detected location resides between two adjacent detected locations.
620

A plurality of predicted locations are generated based on the detected locations, wherein each predicted location is generated based on at least two detected locations.
630

A plurality of virtual predicted locations are generated based on the virtual detected locations, wherein each virtual predicted location is generated based on at least two virtual detected locations.
640

A plurality of new reported location are generated based on the predicted locations, wherein each reported location is generated based on at least one predicted location and at least one reported location.
650

A plurality of new virtual reported location are generated based on the virtual predicted locations, wherein each virtual reported location is generated based on at least one virtual predicted location and at least one virtual reported location.
660

FIG. 8

PREDICTION-BASED TOUCH CONTACT TRACKING

CROSS REFERENCE TO RELATED APPLICATIONS

This application is a continuation of U.S. patent application Ser. No. 14/028,713, filed on Sep. 17, 2013, which claims the benefit of U.S. Provisional Application No. 61/702,301, filed on Sep. 18, 2012, which are herein incorporated by reference for all intents and purposes.

BACKGROUND OF THE INVENTION

1. Field of the Invention

The present invention relates to a touch contact tracking method, and more particularly, to a prediction-based touch contact tracking method.

2. Description of the Prior Art

When an external conductive object touches or approaches a touch screen, the touch screen will detect the location of the external conductive object. Since the touch screen may be affected by noise interference, the detected location of the external conductive object may have certain offset. Referring to FIG. 1, an input track Itrack is the track of an external conductive object moving on a touch screen, and an output track Otrack is the track detected by the touch screen. The output track Otrack may have the jitter phenomenon due to noise interference, especially when the external conductive object is stationary, the detected location may jitter around the external conductive object. The larger the noise, the greater the jittering.

From the above it is clear that prior art still has shortcomings. In order to solve these problems, efforts have long been made in vain, while ordinary products and methods offering no appropriate structures and methods. Thus, there is a need in the industry for a novel technique that addresses these problems.

SUMMARY OF THE INVENTION

Due to noise interference, the locations generated by the signals of a touch screen may have jitters. The present invention includes, when an external object approaches or touches a touch sensor, generating predicted locations of the external object by detected locations according to the signals from the touch sensor, wherein the latest predicted location is shifted backwards towards the latest reported location for a portion of the distance between the predicted location and the latest reported location to generate a new reported location, whereby jittering of the reported locations caused by noise in the signals of the touch sensor can be reduced or filtered.

The above objective of the present invention can be achieved by the following technical scheme. A prediction-based touch contact tracking method in accordance with the present invention may include: generating a plurality of detected locations touched or approached by an external object based on signals received by a touch screen when the external object is touching or approaching the touch screen; and generating a predicted location by multiplying a vector between the two most recently generated detected locations by a predetermined factor that is greater than 1 but less than or equal to 1.5.

The above objective of the present invention can be achieved by the following technical scheme. A prediction-based touch contact tracking method in accordance with the present invention may include: generating a plurality of detected locations touched or approached by an external object based on signals received by a touch screen when the external object is touching or approaching the touch screen; and generating a plurality of predicted locations based on the detected locations, wherein each predicted location is generated by multiplying a vector between two detected locations, which are most recently generated before the predicted location is generated, by a predetermined factor that is greater than 1 but less than or equal to 1.5.

With the above technical means, the present invention includes at least the following advantages and benefits: as new reported location are generated by shifting predicted locations backwards towards previously generated reported locations, jittering in reported locations caused by noise interference on the touch screen are reduced or filtered, and the reported locations are closer to the real touch locations.

BRIEF DESCRIPTION OF THE DRAWINGS

FIGS. 5 and 6 are flowcharts illustrating predication-based touch contact tracking methods in accordance with a first embodiment of the present invention; and FIGS. 7 and 8 are flowcharts illustrating predication-based touch contact tracking methods in accordance with a second embodiment of the present invention.

DETAILED DESCRIPTION OF THE PREFERRED EMBODIMENTS

Figure 1:
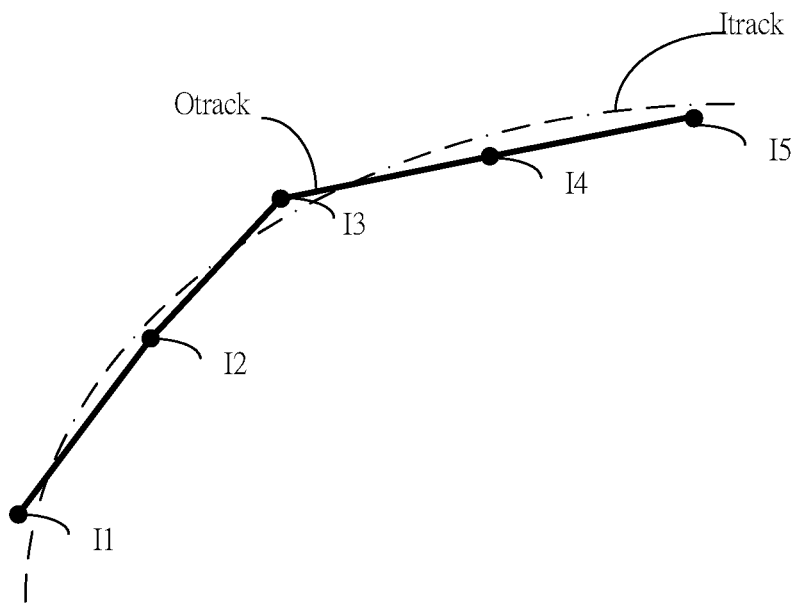
FIG. 1 is a schematic diagram illustrating reporting points for tracking of the prior art.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2:
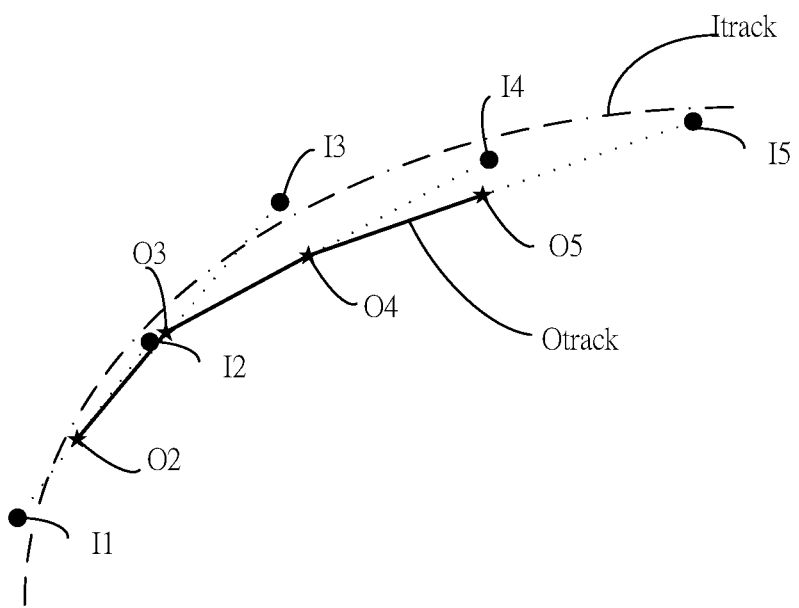
FIG. 2 is a schematic diagram illustrating reporting points for tracking that employs a filtering algorithm.

In order to overcome the prior-art issues, a filtering process is usually employed to reduce or filter out the jittering problem as mentioned before. Referring to FIG. 2, a new reported location can be determined by performing interpolation between the latest reported location (the last reported location) and the latest detected location (the current detected location) with a certain ratio. For example, the touch screen sequentially detects reported locations I1, I2, . . . , I5 based on an input track Itrack, wherein when I2 is detected, a filtering process is carried out based on the latest reported location (assuming the latest reported location is at I1) and the latest detected location I2 with a certain ratio (e.g. 40%) to generate a new reported location O2. Similarly, when the latest detected location I3 is detected, the filtering process is carried out based on the latest reported location O2 and the latest detected location I3 to generate a new reported location O3. With the same analogy, an output track Otrack can be generated from the continuously generated reported locations. It can be seen from FIG. 2 that the output track Otrack lags the input track Itrack by a considerably large distance.

Therefore, in an embodiment of the present invention, a prediction-based touch contact tracking method is provided to address the issue of linear jittering while shortening the distance between the output and input tracks.

Figure 3:
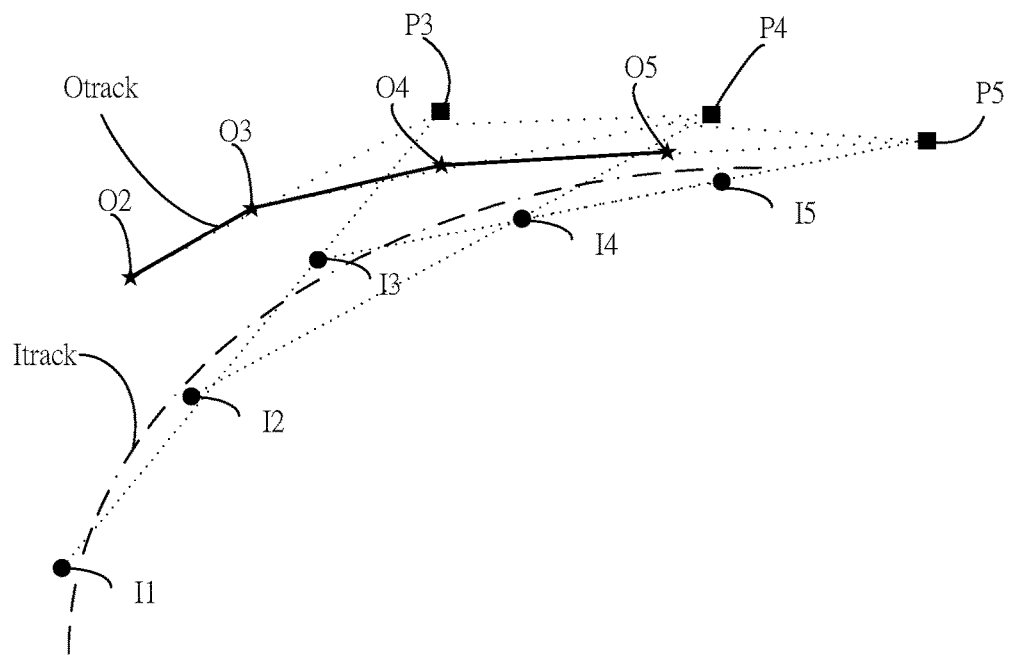
FIG. 3 is a schematic diagram illustrating reporting points for prediction-based touch contact tracking of the present invention.

Referring to FIG. 3, a schematic diagram illustrating a first embodiment of the present invention is shown. A touch screen sequentially detects continuous detected locations (e.g. detected locations I1, I2, . . . , I5), and predicts continuous predicted locations (e.g. predicted locations P3, P4 and P5) based on the detected locations. With the predicted locations, a filtering process is carried out based on the latest reported location (the last reported location) and the latest predicted location (the current predicted location) to generate a new reported location. For example, a predicted location can be determined from at least two detected locations. More specifically, the predicted location P3 is determined from the detected locations I1 and I3; the predicted location P4 is determined from the detected locations I2 and I4; and the predicted location P5 is determined from the detected locations I3 and I5. In this example, predicted locations are determined with a uniform velocity. For example, a translational velocity or vector is calculated from a previous detected location and a following detected location that is one, two or more time unit away from the previous detected location. The location after k time units is predicted based on the translational velocity or vector and based on the following detected location, wherein k may be a natural or real number, for example, k may be 1 or 1.5. Then, the filtering process performing linear interpolation is carried out to generate a new reported location.

In other words, the prediction and filtering processes just described may employ a linear Bezier curve. Given points L0 and L1, a linear Bézier curve is a straight line between these two points. This line is given by the following equation: $B(t)=(1-t)L0+tL1$. When the prediction process is carried out, L0 and L1 are the detected locations (e.g. the detected locations I1 and I3 above), wherein t>1 (e.g. 1.5), and the resulting B(t) is a new predicted location. When the filtering process is carried out, L0 and L1 are the latest reported location and the latest predicted location (e.g. the reported location O2 and the predicted location P3), respectively, wherein $t \in [0,1]$, and the resulting B(t) is a new reported location.

One with ordinary skill in the art can appreciate that there are other ways of predicting a predicted location based on at least two detected locations and other filtering methods. For example, a quadratic Bézier curve can be used. For example, the path of a quadratic Bézier curve is tracked by B(t) as a function of given points L0, L1 and L2: $B(t)=(1-t)^2L0+2t(1-t)L1+t^2L2$. When the prediction process is carried out, L0, L1 and L2 are the detected locations, wherein t>1, and the resulting B(t) is a new predicted location. When the filtering process is carried out, L0 and L1 are the two latest reported locations and L2 is the latest predicted location, wherein $t \in [0,1]$, and the resulting B(t) is a new reported location.

Comparing FIGS. 2 and 3, since FIG. 3 uses the predicted locations, the output track Otrack follows the input track Itrack more closely, for example, the reported location O5 is closer to the detected location I5 in FIG. 3.

With reference to the first embodiment, in a second embodiment of the present invention, at least one virtual detected location is added between each pair of adjacent detected locations among the detected locations. The detected locations and the virtual detected location form continuous input locations. The virtual detected location can be at the middle of each pair of adjacent detected locations, or generated in accordance to the above Bézier curves. Accordingly, the number of detected locations becoming the input locations can be effectively doubled. One with ordinary skill in the art can appreciate that the number of virtual detected location added between each pair of adjacent detected locations can be one, two or more.

Figure 4:
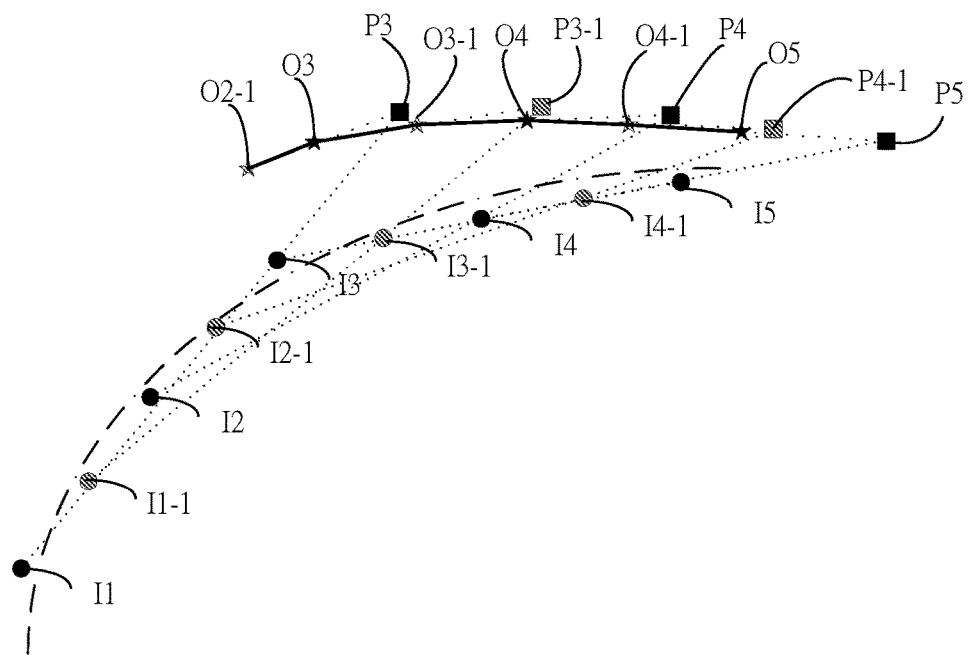
FIG. 4 is a schematic diagram illustrating reporting points for prediction-based touch contact tracking of the present invention with the addition of virtual reported locations.

Referring now to FIG. 4, the touch screen sequentially detects continuous detected locations (e.g. detected locations IL I2, . . . , I5) to generate continuous virtual detected locations (I1-1, I2-1, . . . , I4-1) to form continuous input locations (I1, I1-1, I2, I2-1, . . . , I4, I4-1, I5), and continuous predicted locations (e.g. predicted locations P3, P3-1, P4, P4-1 and P5) are predicted based on the input locations. With the predicted locations, a filtering process is carried out based on the latest reported location (the last reported location) and the latest predicted location (the current predicted location) to generate a new reported location (e.g. reported locations O3, O3-1, O4, O4-1 or O5). In this example, the reported location O2-1 is the reported location immediately before the reported location O3.

The prediction process for predicting a predicted location and the filtering process for generating a reported location have already been described in the first embodiment, so they will not be repeated herein. It can be seen from FIG. 4 that, comparing to FIGS. 1, 2 and 3, the number of reported locations in FIG. 4 is increased, and the output track Otrack appears to be smoother, improving the issue of track jittering as mentioned earlier.

The technical means of the present invention can be applied to most types of the touch screens, for example, resistive, surface acoustic, infrared, optical, surface capacitive, projected capacitive or other types of touch screen that are capable of reporting locations in order to display an output track. Moreover, the present invention can be used to report the output track (or tracks) of one or more external conductive objects.

Referring to FIG. 5, a flowchart illustrating a predication-based touch contact tracking method in accordance with a first embodiment of the present invention is shown. First, as shown in step 510, when an external object touches or approaches a touch screen, a detected location corresponding to the external object is continuously generated from signals received by the touch screen. Next, as shown in step 530, a predicted location is generated continuously based on a most recently generated detected location and at least one previously generated detected location. Then, as shown in step 550, a new reported location is generated continuously based on at least one predicted location including the most recently generated predicted location and at least one reported location including the most recently generated reported location.

Referring to FIG. 6, a flowchart illustrating another predication-based touch contact tracking method in accordance with a first embodiment of the present invention is shown. First, as shown in step 610, when an external object touches or approaches a touch screen, a plurality of continuous detected location corresponding to the external object are generated from signals received by the touch screen. Next, as shown in step 630, a plurality of predicted locations are generated based on the detected locations, wherein each predicted location is generated based on at least two detected locations. Then, as shown in step 650, a plurality of new reported location are generated based on the predicted locations, wherein each reported location is generated based on at least one predicted location and at least one reported location.

In an example of the present invention, a predicted location is generated by multiplying the vector of the two most recently generated detected locations by a predetermined factor greater than 1. In other words, in two detected locations, a new vector is generated by multiplying a vector produced from using the older detected location as the starting point and the newer detected location as the end point by a predetermined factor greater than 1. The predicted location is at the end point of the new vector that is based on the older detected location. In the present invention, generating another location from two locations can be carried out using the example shown above or other methods; the present invention is not limited as such.

In another example of the present invention, a predicted location is generated by multiplying the vector of the two detected locations by a predetermined factor greater than 1, wherein there is at least one detected location between the two detected locations. As such, the two detected locations for generating a predicted location can be adjacent or not adjacent to each other; the present invention is not limited as such.

In contrast to the predicted location being generated by multiplying by a predetermined factor that is greater than 1, a reported location is generated by multiplying by a predetermined factor that is less than 1. For example, a reported location is generated by multiplying the vector of the most recently generated reported location and the most recently generated predicted location by a predetermined factor that is less than 1.

In the example of FIG. 4, in the input locations, input locations I1-1, I2-1, . . . , I4-1 can be regarded as virtual input locations, and in the predicted locations, predicated locations P3-1 and P4-1 can be regarded as virtual predicted locations. Similarly, in the reported locations, reported locations O3-1 and O4-1 can be regarded as virtual reported locations. The virtual reported locations increase the reporting rate, so the line becomes smoother.

Referring to FIG. 7, the method illustrated in FIG. 5 further includes additional steps as follow. As shown in step 520, a virtual detected location is continuously generated based on a most recently generated detected location and an adjacent detected location. Then, as shown in step 540, a virtual predicted location is generated continuously based on a most recently generated virtual detected location and at least one previously generated virtual detected location. Then, as shown in step 560, a new virtual reported location is generated continuously based on at least one virtual predicted location including the most recently generated virtual predicted location and at least one virtual reported location including the most recently generated virtual reported location.

Referring further to FIG. 8, in a best mode of the present invention, the method illustrated in FIG. 6 further includes addition steps as follow. As shown in step 620, a plurality of continuous virtual detected location are generated based on the detected locations, wherein each virtual detected location resides between two adjacent detected locations. Next, as shown in step 640, a plurality of virtual predicted locations are generated based on the virtual detected locations, wherein each virtual predicted location is generated based on at least two virtual detected locations. Then, as shown in step 660, a plurality of new virtual reported location are generated based on the virtual predicted locations, wherein each virtual reported location is generated based on at least one virtual predicted location and at least one virtual reported location.

In an example of the present invention, a virtual predicted location is generated by multiplying the vector of the two most recently generated virtual detected locations by a predetermined factor greater than 1. In another example of the present invention, a virtual reported location is generated by multiplying the vector of the most recently generated virtual reported location and the most recently generated virtual predicted location by a predetermined factor that is less than 1. As such, the two virtual detected locations for generating a virtual predicted location can be adjacent or not adjacent to each other; the present invention is not limited as such.

Moreover, in contrast to the virtual predicted location being generated by multiplying by a predetermined factor that is greater than 1, a virtual reported location is generated by multiplying by a predetermined factor that is less than 1. For example, a virtual predicted location is generated by multiplying the vector of the two virtual detected locations by a predetermined factor that is greater than 1, wherein at least one virtual detected location resides between the two virtual detected locations.

Since a virtual reported location is between reported locations, so the latest (most recently generated) virtual reported location can be regarded as preceding the latest (most recently generated) reported location. Accordingly, the present invention further includes continuously providing a latest virtual reported location and a latest reported location, wherein the latest virtual reported location is provided before the latest reported location.

Furthermore, the predicted locations, the reported locations, the virtual predicted locations and the virtual reported locations mentioned before can be generated by quadratic Bézier curves.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A prediction-based touch contact tracking method, comprising:
   generating a plurality of detected locations touched or approached by an external object based on signals received by a touch screen when the external object is touching or approaching the touch screen; and
   generating a predicted location by multiplying a vector between the two most recently generated detected locations by a predetermined factor that is greater than 1 but less than or equal to 1.5.

2. The tracking method of claim 1, further comprising the step of generating a new reported location based on at least one predicted location including the most recently generated predicted location and at least one reported location including the most recently generated reported location.

3. The tracking method of claim 2, wherein the new reported location is generated by multiplying a vector between the most recently generated reported location and the most recently generated predicted location by a predetermined factor that is greater than 0 but less than 1.

4. The tracking method of claim 1, further comprising:
generating a virtual detected location based on a most recently generated detected location and an adjacent detected location;
generating a virtual predicted location based on a most recently generated virtual detected location and at least one previously generated virtual detected location; and
generating a new virtual reported location based on at least one virtual predicted location including the most recently generated virtual predicted location and at least one virtual reported location including the most recently generated virtual reported location.

5. The tracking method of claim 4, wherein the virtual predicted location is generated by multiplying a vector between the two most recently generated virtual detected locations by a predetermined factor that is greater than 1 but less than or equal to 1.5.

6. The tracking method of claim 4, wherein the virtual reported location is generated by multiplying a vector between the most recently generated virtual reported location and the most recently generated virtual predicted location by a predetermined factor that is greater than 0 but less than 1.

7. The tracking method of claim 4, wherein the virtual predicted location is generated by multiplying a vector between two virtual detected locations by a predetermined factor that is greater than 1 but less than or equal to 1.5, wherein at least one virtual detected location resides between the two virtual detected locations.

8. The tracking method of claim 4, further comprising:
providing the latest virtual reported location and the latest reported location, wherein the latest virtual reported location is provided before the latest reported location.

9. The tracking method of claim 4, wherein the predicted locations, the reported locations, the virtual predicted locations and the virtual reported locations are generated by quadratic Bézier curves.

10. A prediction-based touch contact tracking method, comprising:
generating a plurality of detected locations touched or approached by an external object based on signals received by a touch screen when the external object is touching or approaching the touch screen; and
generating a plurality of predicted locations based on the detected locations, wherein each predicted location is generated by multiplying a vector between two detected locations, which are most recently generated before the predicted location is generated, by a predetermined factor that is greater than 1 but less than or equal to 1.5.

11. The tracking method of claim 10, further comprising the step of generating a plurality of new reported locations based on the predicted locations, wherein each new reported location is generated based on at least one predicted location and at least one reported location.

12. The tracking method of claim 11, wherein the new reported location is generated by multiplying a vector between a most recently generated reported location and a most recently generated predicted location by a predetermined factor that is greater than 0 but less than 1.

13. The tracking method of claim 10, further comprising:
generating a plurality of virtual detected locations based on the detected locations, wherein each virtual detected location is between two adjacent detected locations;
generating a plurality of virtual predicted locations based on the virtual detected locations, wherein each virtual predicted location is generated based on at least two virtual detected locations; and
generating a plurality of virtual reported locations based on the virtual predicted locations, wherein each virtual reported location is generated based on at least one virtual predicted location and at least one virtual reported location.

14. The tracking method of claim 13, wherein the virtual predicted location is generated by multiplying a vector between two most recently generated virtual detected locations by a predetermined factor that is greater than 1 but less than or equal to 1.5.

15. The tracking method of claim 13, wherein the virtual reported location is generated by multiplying a vector between a most recently generated virtual reported location and a most recently generated virtual predicted location by a predetermined factor that is greater than 0 but less than 1.

16. The tracking method of claim 13, wherein the virtual predicted location is generated by multiplying a vector between two virtual detected locations by a predetermined factor that is greater than 1 but less than or equal to 1.5, wherein at least one virtual detected location resides between the two virtual detected locations.

17. The tracking method of claim 13, further comprising:
providing the latest virtual reported location and the latest reported location, wherein the latest virtual reported location is provided before the latest reported location.

18. The tracking method of claim 13, wherein the predicted locations, the reported locations, the virtual predicted locations and the virtual reported locations are generated by quadratic Bézier curves.

\* \* \* \* \*